No. 833,119. PATENTED OCT. 9, 1906.
G. B. BUCKINGHAM.
ANIMAL SLING.
APPLICATION FILED MAY 10, 1906.

Witnesses
T. L. Mockure
James F. Crown

Inventor
G. B. Buckingham
By Rexford M. Smith
Attorney

UNITED STATES PATENT OFFICE.

GEORGE B. BUCKINGHAM, OF BROOKVILLE, INDIANA.

ANIMAL-SLING.

No. 833,119.　　　Specification of Letters Patent.　　　Patented Oct. 9, 1906.

Application filed May 10, 1906. Serial No. 316,140.

*To all whom it may concern:*

Be it known that I, GEORGE B. BUCKINGHAM, a citizen of the United States, residing at Brookville, in the county of Franklin and State of Indiana, have invented a certain new and useful Animal-Sling, of which the following is a specification, reference being had therein to the accompanying drawings.

This invention relates to animal-slings; and the object of the invention is to provide a sling by means of which the weight of the animal will be supported at the upper leg-joints, the points where nature intended the weight of the body of the animal to be sustained, all undue and excessive pressure on the stomach and bowels of the animal being thus overcome and avoiding inflammation and feverish conditions.

A further object of the invention is to provide a sling which is flexible throughout and which is provided with leg-sockets to receive the legs of the animal and which is further provided with means for varying the distance between the leg-sockets whereby the sling is rendered adjustable and adaptable to animals of different sizes, thus adding greatly to the comfort of the animal supported by the sling and expediting the treatment and recovery of the animal.

The sling herein described is adapted to be used in conjunction with the stall patented by me February 24, 1903, No. 721,540.

With the above and other objects in view, the nature of which will more fully appear as the description proceeds, the invention consists in the novel construction, combination, and arrangement of parts, as herein fully described, illustrated, and claimed.

Figure 1:
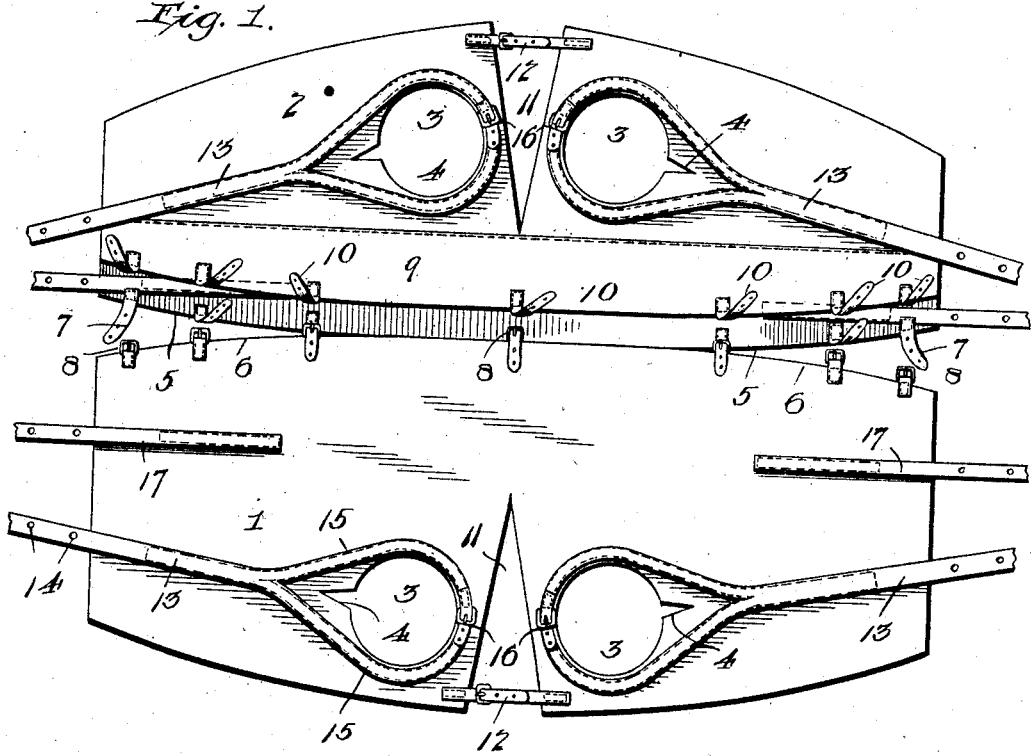
Figure 2:
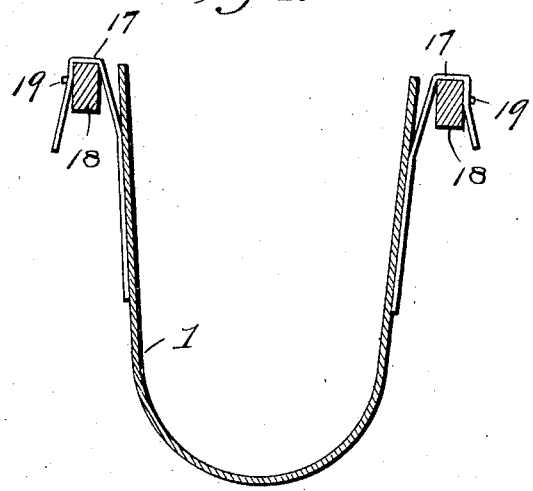

In the accompanying drawings, Figure 1 is a bottom plan view of a sling embodying the present invention. Fig. 2 is a vertical cross-section through the same, illustrating the manner of supporting the sling.

The sling contemplated in this invention is composed of flexible material throughout, such as leather or canvas, and comprises a plurality of sections 1 and 2, each of which is provided with leg-sockets 3, through which the legs of the animal to be treated are received. These leg-sockets are ordinarily round, and each socket is preferably formed with a slit 4, which adapts the edges bounding the socket to yield downward and fit snugly around the animal's leg, thus adding to the comfort of the animal.

The adjoining edges of the sections 1 and 2 are rounded on gradual curves, as shown at 5 and 6, and provided with fastenings, such as straps 7 and buckles 8, to enable the sections to be adjusted relatively to each other, adapting the sling as a whole to be adjusted to suit the animal. To increase the capacity for adjustment of the sections 1 and 2, one of said sections has a flap 9 secured thereto, extending parallel to one of the rounded edges of the sections, and said flap is provided with additional straps 10, which may be used in connection with the buckles 8 in place of the straps 7, before referred to. Either set of straps 7 and 10 may be used with the buckles 8, thus giving a wide adjustment to the sections of the sling to provide for considerable variation in the distance between the leg-sockets to suit different animals.

At the front and back the sections are provided with V-shaped incisions 11, and across the outer wider portions of such incisions are stay or tie straps 12 with adjusting-buckles, enabling slack to be taken up in front and rear portions of the sling, so that the supporting-points of the sling may be brought directly coincident with the upper leg-joints.

In connection with each of the leg-sockets 3 a main supporting eyestrap 13 is employed, the same being secured permanently to the body of the sling by stitching or otherwise. The outer end of each supporting-strap is provided with a series of holes 14 for connecting the same to the frame of an animal-stock, as shown in Fig. 2, while the inner portion of said strap is branched and the branches 15 thereof are extended in opposite directions around the respective leg-socket and fastened to the body of the sling by stitching or otherwise, as indicated in Fig. 1. The body of the sling is cut through on the line 16 between the leg-sockets and the incisions 11, and the ends of the branches 15 extend across the cuts 16 and are adjustably connected by buckles or their equivalent, as shown, thereby providing for a snug fit around the legs of the animal close up to the body immediately adjacent to the upper leg-joints. Additional supporting-straps 17 may be provided at suitable points.

The stock is usually provided with parallel horizontal bars 18, over which the straps 13 and 17 are hung, and said bars have holding-pins 19 to enter the holes 14 of the supporting-straps to sustain the sling at any desired elevation above the floor or ground.

By the use of the sling hereinabove described the weight of the animal may be brought to bear and be sustained on and by the upper leg-joints, thus removing the pressure from the stomach and bowels, obviating liability of inflammation and reducing tendency toward feverish conditions resulting from the use of improperly designed and constructed slings heretofore used.

I claim—

1. An animal-sling embodying leg-sockets and adjusting means for varying the lateral distance between the leg-sockets.

2. An animal-sling embodying a flexible body provided with leg-sockets and incisions between said sockets, and adjusting tie-straps extending across the incisions and connected with the body to vary the distance between laterally opposite sockets.

3. An animal-sling embodying a flexible body provided with leg-sockets, and supporting-straps extending around the leg-sockets.

4. An animal-sling embodying a flexible body provided with leg-sockets, and supporting-straps extending around the leg-sockets and made adjustable for the purpose set forth.

5. An animal-sling embodying a flexible body having leg-sockets, and supporting-straps secured thereto and having branches passing around opposite sides of the leg-sockets and adjustably connected.

6. An animal-sling embodying a flexible body having leg-sockets, and supporting-straps having branches extending around opposite sides of the leg-sockets, said branches being fastened to the body of the sling and adjustably connected at their ends.

7. An animal-sling embodying a flexible body comprising a plurality of sections adapted to overlap and having leg-sockets, a flap on one section, and fastening means for securing the adjoining section to said flap.

In testimony whereof I affix my signature in presence of two witnesses.

GEO. B. BUCKINGHAM.

Witnesses:
J. W. BAKER,
CHAS. E. WINSCOTT.